United States Patent [19]

Himeno et al.

[11] Patent Number: 5,340,930
[45] Date of Patent: Aug. 23, 1994

[54] MONOAZO DYE HAVING A THIOPHENE DERIVATIVE AS DIAZO COMPONENT

[75] Inventors: Kiyoshi Himeno, Munakata; Ryouichi Sekioka, Kitakyushu, both of Japan

[73] Assignee: Hoechst Mitsubishi Kasei Co., Ltd., Tokyo, Japan

[21] Appl. No.: 893,022

[22] Filed: Jun. 3, 1992

[30] Foreign Application Priority Data

Jun. 11, 1991 [JP] Japan .................. 3-139267

[51] Int. Cl.$^5$ .................. C09B 29/033; C09B 29/09
[52] U.S. Cl. .................. 534/753; 534/794
[58] Field of Search .................. 534/753, 794

[56] References Cited

U.S. PATENT DOCUMENTS

| | | | |
|---|---|---|---|
| 4,211,696 | 7/1980 | Baird et al. | 534/753 X |
| 5,283,326 | 2/1994 | Hansen et al. | 534/753 X |

FOREIGN PATENT DOCUMENTS

| | | |
|---|---|---|
| 109857 | 5/1984 | European Pat. Off. .......... 534/753 |
| 0201896 | 11/1986 | European Pat. Off. . |
| 0311910 | 4/1989 | European Pat. Off. . |
| 2304204 | 8/1973 | Fed. Rep. of Germany . |
| 57-47214 | 10/1982 | Japan . |
| 58-89653 | 5/1983 | Japan .................. 534/753 |
| 58-101157 | 6/1983 | Japan .................. 534/753 |
| 58-157863 | 9/1983 | Japan .................. 534/753 |
| 59-93752 | 5/1984 | Japan .................. 534/753 |
| 59-96164 | 6/1984 | Japan . |
| 60-239291 | 11/1985 | Japan . |
| 1394365 | 5/1975 | United Kingdom .......... 534/753 |

OTHER PUBLICATIONS

Chemical Abstracts, vol. 104, No. 24, p. 617, No. 216609u, Jun. 16, 1986, T. Niwa, et al., "Dyes for Thermal Recording".

Chemical Abstracts, vol. 101, No. 20, p. 90, No. 173019v, Nov. 12, 1984, "Bright Blue Disperse Azo Dyes for Polyester Fibers", & JP-A-59-096-164.

Research Disclosure, pp. 425–427, Oct. 1980, "Discharge/Resist Printing of Synthetic Textile Materials Using Thiophene-Azo Disperse Dyestuffs in the Presence of Alkali".

*Primary Examiner*—Patricia L. Morris
*Assistant Examiner*—Fiona T. Powers
*Attorney, Agent, or Firm*—Oblon, Spivak, McClelland, Maier & Neustadt

[57] ABSTRACT

A monoazodye of the following formula (I):

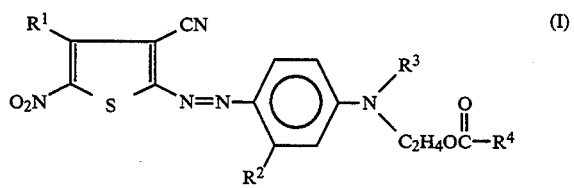

wherein $R^1$ is hydrogen, methyl or chlorine, $R^2$ is hydrogen or methyl, $R^3$ is $C_1$–$C_5$ alkyl, $R^4$ is phenyl, benzyl, phenoxy, $C_1$–$C_5$ alkoxy, $C_1$–$C_5$ alkyl or benzyloxy, provided that when $R^4$ is alkyl, the total number of carbon atoms of $R^3$ and $R^4$ is at least 4.

The monoazo dye of the present invention can be used to dye fibers such as polyester fibers, blended yarn products or combined filament yarn products such as polyester fibers with natural fibers.

5 Claims, No Drawings

MONOAZO DYE HAVING A THIOPHENE DERIVATIVE AS DIAZO COMPONENT

The present invention relates to a monoazodye. More particularly, it relates to a water-insoluble blue monoazo disperse dye which is excellent in the pH dependency and the alkali perspiration fastness.

In recent years, polyester fibers are often subjected to alkali treatment for weight reduction to improve the feeling of the fibers. In such a case, the alkali will remain in the fibers, whereby the pH during the dyeing operation tends to be high, and there has been a problem that when a conventional dye is used, reproducibility during the dyeing tends to be poor.

For example, Japanese Examined Patent Publication No. 47214/1982 discloses a monoazodye of the following formula:

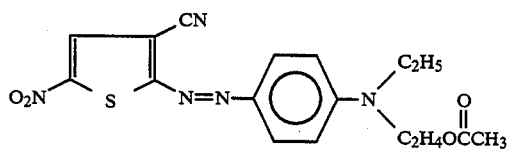

However, this dye is inferior in the pH dependency and is not suitable for dyeing polyester fibers to which alkali treatment for weight reduction has been applied. Further, this dye is inferior also in the alkali perspiration fastness.

It is an object of the present invention to provide a blue disperse dye having good alkali resistance and excellent pH dependency, alkali perspiration fastness and light fastness.

The present invention provides a monoazodye of the following formula (I):

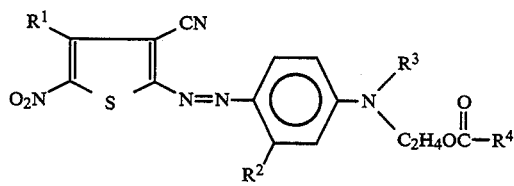

wherein $R^1$ is hydrogen, methyl or chlorine, $R^2$ is hydrogen or methyl, $R^3$ is $C_1$–$C_5$ alkyl $R^4$ is phenyl, benzyl, phenoxy, $C_1$–$C_5$ alkoxy, $C_1$–$C_5$ alkyl or benzyloxy, provided that when $R^4$ is alkyl, the total number of carbon atoms of $R^3$ and $R^4$ is at least 4.

Now, the present invention will be described in detail with reference to the preferred embodiments.

In the above formula (I), $R^1$ is hydrogen, methyl or chlorine, and $R^2$ is hydrogen or methyl. The $C_1$–$C_5$ alkyl for $R^3$ may, for example, be a straight chain or branched chain $C_1$–$C_5$ alkyl such as methyl, ethyl, n-propyl, i-propyl, n-butyl, sec-butyl or n-pentyl. $R^4$ is phenyl, benzyl, phenoxy, $C_1$–$C_5$ alkoxy, $C_1$–$C_5$ alkyl or benzyloxy. However, when $R^4$ is alkyl, the total number of carbon atoms of $R^3$ and $R^4$ is at least 4. The $C_1$–$C_5$ alkoxy for $R^4$ may, for example, be a straight chain or branched chain $C_1$–$C_5$ alkoxy corresponding to the $C_1$–$C_5$ alkyl for $R^3$. The $C_1$–$C_5$ alkyl for $R^4$ may, for example, be the same alkyl as for $R^3$.

The structural feature of the dye of the present invention resides in that a substituent of relatively large molecular weight such as phenyl, benzyl, phenoxy, alkoxy or benzyloxy, is used as $R^4$, or when $C_1$–$C_5$ alkyl is used as $R^4$, the total number of carbon atoms of $R^3$ and $R^4$ is at least 4 so that the total molecular weight of $R^3$ and $R^4$ would be relatively large.

Among various dyes of the above formula (I) of the present invention, dyes of the following formulas (I-1) and (I-2) are particularly advantageous:

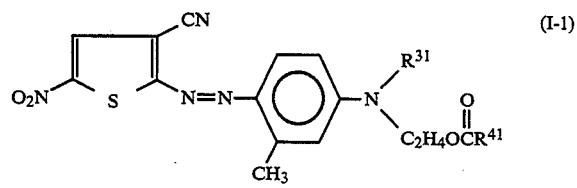

wherein each of $R^{31}$ and $R^{41}$ which are independent of each other, is $C_1$–$C_5$ alkyl, and the total number of carbon atoms of $R^{31}$ and $R^{41}$ is at least 5.

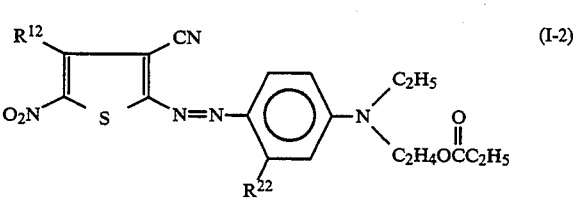

wherein $R^{12}$ is methyl or chlorine, and $R^{22}$ is hydrogen or methyl.

Further, in the above formula (I-2), $R^{12}$ is preferably chlorine.

The monoazodye of the above formula (I) can be prepared, for example, by diazotizing an amine of the following formula (II):

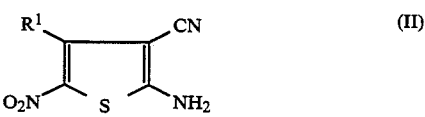

wherein $R^1$ is as defined above, by a usual method, following by coupling with an aniline of the following formula (III):

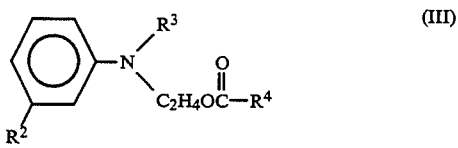

wherein $R^2$, $R^3$ and $R^4$ are as defined above.

Fibers which can be dyed by the monoazodye of the present invention, may, for example, be polyester fibers such as polyethylene terephthalate or a polycondensation product of terephthalic acid and 1,4-bis(hydroxymethyl)cyclohexane, or blended yarn products or combined filament yarn products (cloth, fabrics, etc.) of such polyester fibers with natural fibers such as cotton, silk or wool.

To conduct dyeing by using the dye of the present invention, the monoazodye of the above formula (I) is dispersed in an aqueous medium by using a dispersing agent in accordance with a usual method to obtain a dyeing bath or a printing paste, followed by dip dyeing or textile printing.

For example, to conduct the dip dyeing, a usual dyeing treatment method such as a high temperature dyeing method, a carrier dyeing method or a thermosol dyeing method, may be used to apply dyeing having excellent fastness to polyester fibers or blended yarn products or combined filament yarn products thereof. In some cases, an acidic substance may be incorporated to the dyeing bath to obtain a better result.

The dyed cloth obtained by the above dip dyeing or textile printing by using the monoazodye of the present invention, is excellent in various properties at the time of dyeing, such as the dyeing property, the build-up property and the pH dependency, and it is excellent in various fastness such as alkali perspiration fastness, light fastness, sublimation fastness, washing fastness, perspiration fastness and water fastness. Further, even when post-treatment is applied to this dyed cloth, there will be no substantial deterioration of the wet fastness according to the present invention.

The monoazodye of the present invention may be used in combination with a dye of the same type or different type.

The compound of the present invention is excellent in the pH dependency and the alkali perspiration fastness as compared with known compounds, by virtue of the difference of the terminal of one of the substituents of the amino group of the coupling component, in spite of the fact that it is structurally very similar to known compounds as disclosed in e.g. Japanese Examined Patent Publication No. 47214/1982, and it is very useful as a dye for polyester fibers.

Now, the present invention will be described in further detail with reference to Examples. However, it should be understood that the present invention is by no means restricted to such specific Examples.

EXAMPLE 1

0.5 g of a monoazodye of the following formula:

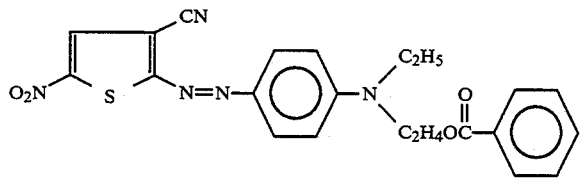

was dispersed in 2 l of water containing 0.25 g of a naphthalene sulfonic acid-formaldehyde condensation product and 0.25 g of a sulfuric acid ester of a higher alcohol, to obtain a dyeing bath. To this dyeing bath, 100 g of polyester fibers were dipped and dyed at 130° C. for 60 minutes, followed by soaping, washing with water and dried, to obtain a cloth dyed with clear blue color. The pH dependency of the above dye during the dyeing was 100, and the alkali perspiration fastness was excellent at a level of grade 4 to 5.

The pH dependency is represented by the percentage of the amount of exhaustion when dyed at pH 9.5 relative to the amount of exhaustion when dyed at pH 5.0 by the above dyeing method, and the pH dependency being 100 is the best. The alkali perspiration fastness was evaluated by the staining degree of a white nylon cloth in accordance with method of JIS 0848 A.

The dye used in this Example was prepared as follows.

16.9 g of 2-amino-3-cyano-5-nitrothiophene was dissolved in a mixture comprising 33 g of 98% sulfuric acid and 33 g of glacial acetic acid, and then 33 g of 43% nitrosyl sulfuric acid was added thereto at 5° C. Then, the mixture was stirred for 2 hours to obtain a diazo solution. The 2-amino-3-cyano-5-nitrothiophene was synthesized in accordance with the method disclosed in Japanese Examined Patent Publication No. 47214/1982.

Then, 34.3 g of N-ethyl-N-phenylcarbonyloxyethylaniline was dissolved in 500 ml of methanol, and then the above diazo solution was dropwise added thereto at a temperature of not higher than 10° C. Then, the mixture was neutralized with sodium acetate to pH 5, followed by filtrating, washing with water and drying to obtain the desired dye. The maximum absorption wavelength ($\lambda_{max}$ in acetone) of the dye was 596 nm.

COMPARATIVE EXAMPLE 1

A monoazodye of the following formula:

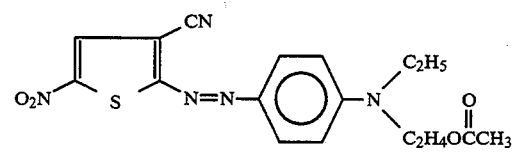

(corresponding to the compound in Example 94 of Japanese Examined Patent Publication No. 47214/1982) was synthesized in the similar manner as in Example 1, and polyester fibers were dyed and evaluated in the same manner as in Example 1, whereby the pH dependency was very poor at a level of 60, and the alkali perspiration fastness was also poor at a level of grade 3.

EXAMPLES 2 to 31

Various dyes as identified in Table 1 were synthesized in the similar manner as in Example 1, and polyester fibers were dyed, and the pH dependency and alkali perspiration fastness were investigated in the same manner as in Example 1. The results are shown in Table 1.

TABLE 1

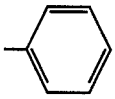

| Example | R¹ | R² | R³ | R⁴ | $\lambda_{max}$ (in acetone) | pH dependency | Alkali perspiration fastness (grade) |
|---|---|---|---|---|---|---|---|
| 2 | H | CH₃ | C₂H₅ | 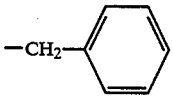 | 626 | 100 | 4–5 |
| 3 | H | CH₃ | C₂H₅ | —CH₂—<phenyl> | 626 | 100 | 4–5 |
| 4 | H | CH₃ | C₂H₅ | —O—<phenyl> | 624 | 100 | 4–5 |
| 5 | H | CH₃ | C₂H₅ | —OCH₃ | 624 | 90 | 4 |
| 6 | H | CH₃ | C₂H₅ | —OC₂H₅ | 624 | 90 | 4–5 |
| 7 | H | CH₃ | C₂H₅ | —OC₄H₉(n) | 624 | 90 | 4–5 |
| 8 | H | CH₃ | C₂H₅ | —OCH₂—<phenyl> | 624 | 90 | 4–5 |
| 9 | H | CH₃ | C₂H₅ | —OC₅H₁₁(n) | 624 | 90 | 4–5 |
| 10 | H | CH₃ | C₅H₁₁(n) | —OC₃H₇(n) | 628 | 90 | 4–5 |
| 11 | H | CH₃ | C₄H₉(n) | <phenyl> | 630 | 90 | 4–5 |
| 12 | H | H | C₂H₅ | —O—<phenyl> | 594 | 100 | 4–5 |
| 13 | H | H | C₂H₅ | —OC₂H₅ | 594 | 100 | 4–5 |
| 14 | H | H | C₄H₉(n) | <phenyl> | 600 | 100 | 4–5 |
| 15 | H | H | C₄H₉(n) | —OCH₃ | 598 | 100 | 4 |
| 16 | H | H | C₄H₉(n) | —O—<phenyl> | 598 | 100 | 4 |
| 17 | H | CH₃ | CH₃ | <phenyl> | 620 | 100 | 4 |

TABLE 1-continued

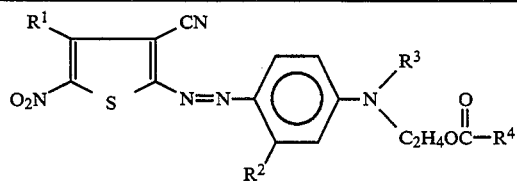

| Example | $R^1$ | $R^2$ | $R^3$ | $R^4$ | $\lambda_{max}$ (in acetone) | pH dependency | Alkali perspiration fastness (grade) |
|---|---|---|---|---|---|---|---|
| 18 | $CH_3$ | $CH_3$ | $C_2H_5$ | phenyl | 624 | 100 | 4 |
| 19 | $CH_3$ | $CH_3$ | $C_2H_5$ | $-O-$phenyl | 622 | 100 | 4 |
| 20 | $CH_3$ | $CH_3$ | $C_2H_5$ | $-OCH_3$ | 622 | 95 | 4 |
| 21 | $CH_3$ | $CH_3$ | $C_2H_5$ | $-OC_4H_9(n)$ | 622 | 95 | 4-5 |
| 22 | $CH_3$ | H | $C_4H_9(n)$ | phenyl | 598 | 95 | 4-5 |
| 23 | $CH_3$ | H | $C_2H_5$ | phenyl | 594 | 95 | 4-5 |
| 24 | Cl | H | $C_2H_5$ | phenyl | 599 | 95 | 4-5 |
| 25 | Cl | $CH_3$ | $C_2H_5$ | phenyl | 630 | 95 | 4-5 |
| 26 | Cl | $CH_3$ | $C_2H_5$ | $-OCH_3$ | 630 | 95 | 4 |
| 27 | H | $CH_3$ | $C_2H_5$ | $C_3H_7(n)$ | 626 | 100 | 4-5 |
| 28 | H | $CH_3$ | $C_4H_9(n)$ | $CH_3$ | 628 | 100 | 4-5 |
| 29 | Cl | H | $C_2H_5$ | $C_2H_5$ | 621 | 100 | 4-5 |
| 30 | Cl | $CH_3$ | $C_2H_5$ | $C_2H_5$ | 626 | 100 | 4-5 |
| 31 | Cl | H | $C_4H_9(n)$ | $CH_3$ | 624 | 100 | 4-5 |

We claim:

1. A monoazo dye of the following formula (I):

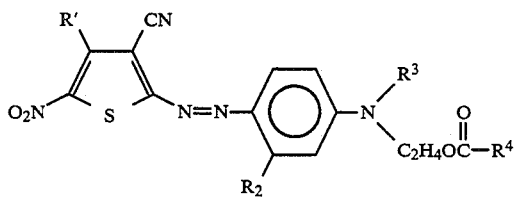

(I)

wherein $R^1$ is hydrogen, methyl or chlorine, $R^2$ is hydrogen or methyl, $R^3$ is $C_{2-4}$ alkyl, $R^4$ is $C_{1-3}$ alkyl, and the total number of carbon atoms of $R^3$ and $R^4$ is at least 4.

2. The monoazo dye according to claim 1, wherein $R^1$ is hydrogen.

3. The monoazo dye according to claim 1, wherein the total number of carbon atoms of $R^3$ and $R^4$ is at least 5.

4. A monoazo dye represented by the following formula (I-2):

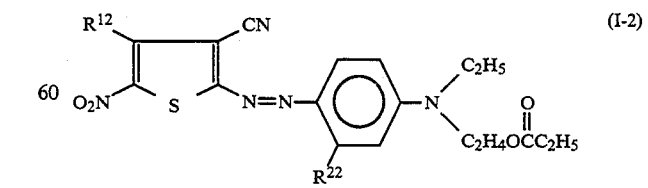

(I-2)

wherein $R^{12}$ is methyl or chlorine, and $R^{22}$ is hydrogen or methyl.

5. The monoazo dye according to claim 4, wherein $R^{12}$ is chlorine.

* * * * *